Figures 3, 4:
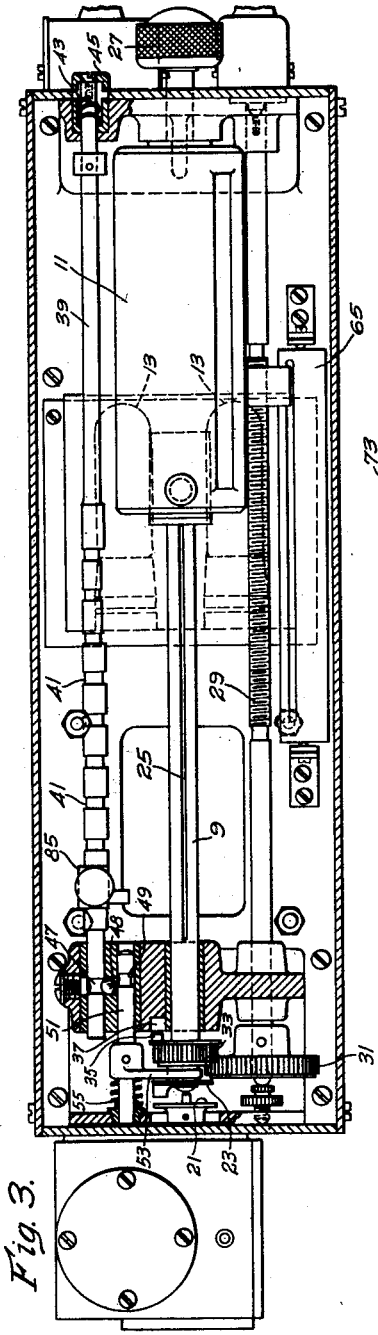

Dec. 18, 1934.      LA VERNE R. PHILPOTT      1,985,057
FACSIMILE TRANSMITTER
Filed Aug. 20, 1932      2 Sheets-Sheet 1
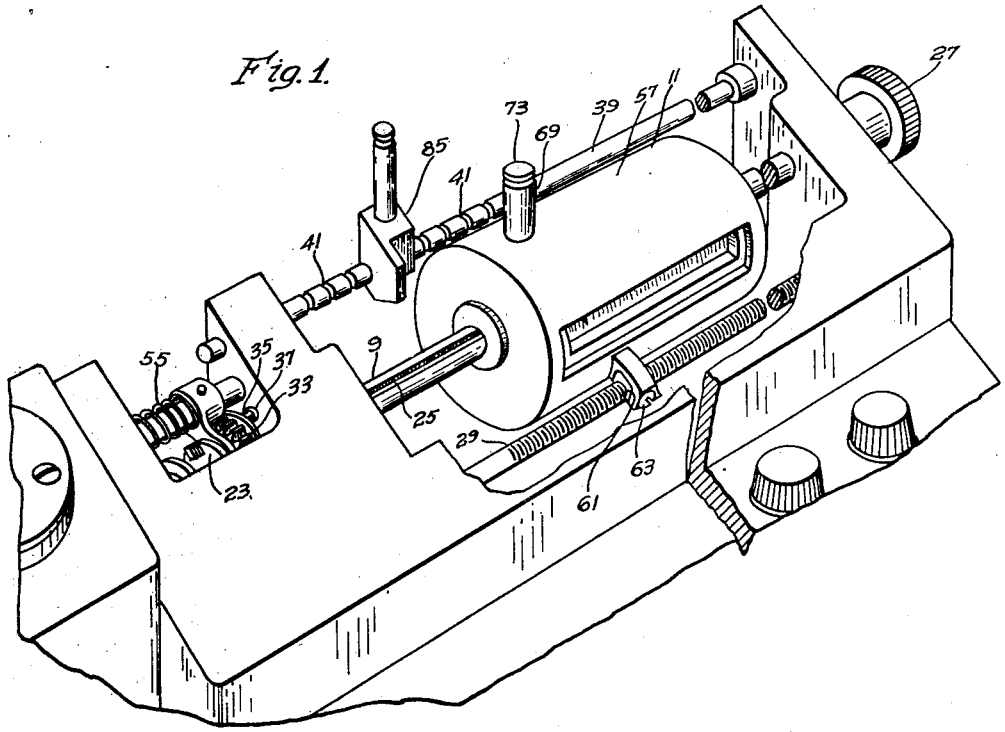
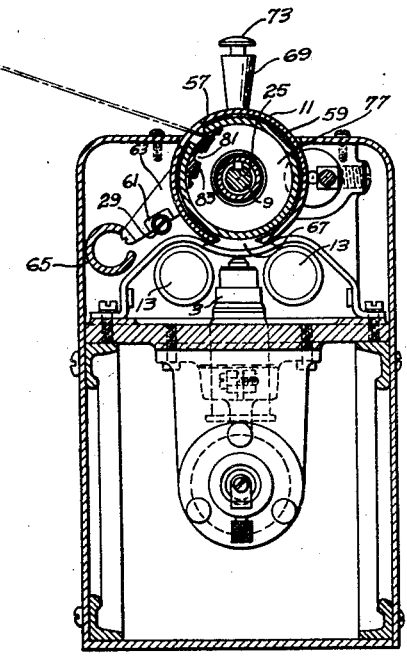
WITNESSES:
INVENTOR
La Verne R. Philpott
BY
ATTORNEY Dec. 18, 1934.　　　LA VERNE R. PHILPOTT　　　1,985,057
FACSIMILE TRANSMITTER
Filed Aug. 20, 1932　　　2 Sheets-Sheet 2

WITNESSES:

INVENTOR
La Verne R. Phillpott.
BY
ATTORNEY

Patented Dec. 18, 1934

1,985,057

UNITED STATES PATENT OFFICE 1,985,057

FACSIMILE TRANSMITTER

La Verne R. Philpott, Wilkinsburg, Pa., assignor to Westinghouse Electric & Manufacturing Company, East Pittsburgh, Pa., a corporation of Pennsylvania Application August 20, 1932, Serial No. 629,638

2 Claims. (Cl. 178—13)

My invention relates to facsimile transmitters, and more particularly to improvements in scanning apparatus therefor.

According to the prior art as known by me, when it was desired to transmit a picture or the like, it required that the picture be wrapped around a cylinder and some clamping means be additionally provided for manually clamping and tightening the picture around the cylinder. This procedure was a relatively cumbersome one and involved an appreciable amount of time and effort.

It is an object of my invention to provide apparatus which will permit loading of the scanning cylinder in a small fraction of the time formerly required with apparatus of the prior art.

It is a further object of my invention to provide apparatus which will be self-loading.

Further objects of my invention reside in providing automatic stopping means whereby the transmission of a picture or the like may be brought to a halt automatically after a desired portion of the picture has been transmitted.

Additional objects of my invention will be brought out in the following description of the same.

The invention embodied in this application is directed toward the scanning means illustrated in perspective in Fig. 1 of the accompanying drawings.

In Figs. 2, 3 and 4 I have shown this scanning means in detail and sectional views in combination with the optical system and the power system normally required with apparatus of the type disclosed in Fig. 1.

Referring to the drawings, the apparatus disclosed may be, in general, divided into three sections, each housed in a separate compartment. In the one compartment is located a source of light 1 employed in combination with the optical system 3 for scanning the picture or other subject matter to be transmitted. In the same compartment is also located the driving motor 5 for operating the scanning drum. The second compartment houses the gearing arrangement 7 for transmitting power from the driving motor to the shaft 9 of the scanning drum. In the third compartment is located a scanning drum 11 and its associated mechanism, together with the photo-cell or photo-cells 13 which receive the reflected light from the subject being scanned.

The optical system located in compartment 1 includes a chopper mechanism of an improved type which forms the subject matter of Patent No. 1,877,566, issued Sept. 13, 1932, in my name and assigned to Westinghouse Electric & Manufacturing Company. Briefly speaking, the chopper mechanism comprises a masking element 15 of cylindrical shape surrounding the light source 1 and provided with a slit in line with the telescope 3 for permitting a steady ray of light to pass through the optical system of the telescope from the light source. Attached to a shaft of the motor and surrounding the masking element is a cup-shaped element 17 provided with a plurality of slits in the cylindrical surface thereof, so positioned that each slit will coincide with the slit in the masking element during rotation of the cup-shaped member. Rotation of this member, therefore, will serve to chop the light beam at a frequency determined by its speed of rotation and the number of slots provided therein.

The motor shaft is also connected to the gear train 7 through a clutch 19, the gear train translating the rotational movement of the motor to an element 21 of a clutch which is adapted to engage a similar element 23 attached to the extremity of the shaft 9 upon which the scanning drum is mounted. The shaft is provided with a keyway 25 for a greater portion of its length and terminates at its other extremity in a knob 27 adapted to be grasped by the hand for manipulating purposes.

Mounted in suitable support, I provide a screw-threaded shaft 29 which is adapted to be rotated by means of a geared connection to the shaft 9 upon which the scanning drum is mounted. This gear connection comprises the gear 31 located at one extremity of the threaded shaft and shown in engagement with a similar gear 33 mounted on the other shaft. This latter gear is provided with a small projection 35 on one of its sides which projection is adapted to slide into a depression 37 provided in the support or bearing for the shaft upon which this gear is mounted.

Mounted in similar supports, I provide an additional shaft 39 on which I provide a plurality of parallel circumferential grooves 41. At one extremity of this shaft is located a spring 43 tending to force this shaft in a direction toward the right and a push button 45 is provided at this extremity whereby this shaft may be forced inwardly to the left against the action of this spring.

At the other extremity of the shaft, in particular, that portion supported within the bearing, I provide a circumferential groove 47. Within the bearing proper, I also provide a small channel 48 of approximately the width of the groove in the shaft and so position this channel that it will be in alignment with the groove 47 in the shaft when the shaft is forced toward the left by reason of pressure being brought to bear upon the push button at its far extremity.

This channel is also adapted to be in alignment with a similar groove 49 in a short shaft 51, one end of which is mounted in the same bearing and the other end of which is supported in one of the side walls of the compartment. This shaft is provided with a shift lever 53 affixed thereto, the free end of which is connected to the shaft 9 of the scanning drum between the clutch element 23 and the gear 33. A spring 55 provided on the short shaft between the side wall of the compartment and the shift lever is intended to exert pressure against the lever, forcing the shaft to the right. The grooves in the short shaft 51 and the other shaft 39 are so positioned, however, that the grooves will not normally be in alignment with the channel at any one time.

In the channel is located a ball bearing, the diameter of which is slightly greater than the length of the channel, so that it will mesh with whichever one of the grooves happens to be in alignment with the channel.

The scanning drum 11 referred to previously, comprises two concentric cylinders, an outer cylinder 57, an inner cylinder 59, provided with aligned openings extending substantially the length of the cylinder but being rather narrow in width. The space between the cylinders is just sufficient to admit of the passage of sheet material upon which a picture or the like might be printed. The outer cylinder is loosely mounted on the shaft 9 and is held against rotational movement on its shaft by means of a half-nut 61 affixed to an extension 63 on the cylindrical surface of the drum and maintained in screw-threaded engagement with the threaded shaft 29 by means of a nut toggle latch 65. This outer drum, however, is permitted to slide along the shaft in a translatory movement and such a movement is given to this cylinder through rotation of the threaded shaft 29 and the half-nut connection therewith. On the under surface of this outer cylinder is provided an additional slotted opening 67 so positioned as to permit the light ray from the light source 1 to pass therethrough.

On the upper surface of the outer cylinder toward one extremity thereof I provide a reset handle 69 having an axial opening therethrough to receive a picture clamp release button comprising a small rod 71 extending through the reset handle terminating in a push button 73 which is maintained in an "up" position by means of a small spring 75 mounted within the handle between a shoulder provided therein and the push button element. This small rod is adapted to be depressed within the outer cylinder a distance sufficient to permit it to engage the inner cylinder 59. This inner cylinder has no rigid connection with its shaft, but rotational movement is conveyed thereto by means of a disk element 77 which is keyed to the shaft 9 and a coil spring 79 surrounding the shaft, one end of which is attached to the disk and the other extremity of the spring being connected to one of the end walls of the inner cylinder. This disk is provided with two circumferential notches so positioned as to leave a small projection 81 existing between them and on this projection is mounted a clamping bar 83 extending practically the full length of the cylinder and provided on its under surface with a groove into which this projection is adapted to fit and is capable of sliding. The disk is of a diameter substantially that of the inside of the inner cylinder and the clamping bar is adapted to bear up against the inner surface of the cylinder, and, in its normal position, is adapted to close the slotted opening in this cylinder.

On the shaft previously referred to, which is provided with the plurality of circumferential grooves, I provide a stop element 85 which is capable of being adjusted in its position on the shaft by causing it to engage any one of the circular grooves desired.

Having described the structural details of the apparatus, I will now proceed to describe the operation and the functions of the various elements.

Referring to the apparatus as a whole, the light from the source passes through the telescope, through the slot in the outer cylinder and strikes a spot on the subject which is wrapped around the inner cylinder. The light is reflected with an intensity depending upon the characteristic of that spot on the picture and strikes the photocells to vary the current in an electrical circuit associated with the photo-cells. Scanning is accomplished by causing the picture to rotate and at the same time assume a translatory motion, and this is brought about by means of the driving motor and the gear train whereby the desired speed of rotation is conveyed to the scanning cylinder.

When it is desired to set up the apparatus for operation, the picture release button is pressed downwardly causing the rod to engage the inner cylinder and with this rod in engagement, the outer cylinder is pushed backward through a small angle to lift the half-nut out of engagement with the threaded shaft. By reason of the engagement with the inner cylinder by means of the rod, this inner cylinder will also be rotated backwardly through an angle against the action of the spring which connects it with the disk. By reason of the fact that the disk is keyed to the shaft and is in positive engagement with the clamping bar, the angular movement of the inner cylinder will be relative to the clamping bar which remains stationary. With the apparatus in this position, the picture to be transmitted may be slipped in through the slots in the cylinders and upon release of the picture clamp release button, the inner cylinder will be forced back into its normal position by means of the spring and the edge of the picture will be clamped between one edge of the slot in the inner cylinder and the clamping bar. The outer cylinder is brought back to its operating position with the half-nut in engagement with the threaded shaft. By means of the knob, the shaft carrying the cylinders may be forced inwardly to the left, bringing the clutch elements into engagement whereby the shaft will be caused to rotate. Rotation of the shaft will bring about rotation of the inner cylinder causing it to wrap the picture about itself in position for scanning. By reason of the gear connection between this shaft and the threaded shaft, the threaded shaft will also be caused to rotate, thus imparting to the cylinders the necessary translatory motion.

At the time that the clutch mechanism is thrown into engagement, the shift lever is also forced to the left against the action of the spring, bringing the circumferential groove in the short shaft in alignment with the ball bearing channel. By reason of the fact that the shaft is under spring tension tending to force the shaft to the right, this movement of the shaft is permitted to take place at this time since the ball bearing can be forced into engagement with the groove of the short shaft.

In the apparatus in the operating position as just described, the cylinders around which the picture has been wrapped will rotate, and, at the same time, the translatory movement of the outer cylinder will cause the inner cylinder to also move toward the left along the shaft. When the cylinder has moved a sufficient distance in its translatory motion to reach the stop, it will bear against the stop and on further movement will force the shaft to the left against the action of the spring until the circumferential groove in the end of this shaft is brought into alignment with the ball bearing channel at which instant the short shaft, by reason of the spring mounted thereon, will be forced to the right, thus causing the shift lever to act upon the shaft in such a direction as to tend toward a separation of the clutch elements. However, a complete separation of the clutch elements cannot take place until the tooth element on the gear arrives opposite the depression in the bearing support, at which time the tooth element will be forced into the depression permitting a complete separation of the clutch elements and this will naturally stop the operation of the scanning device. The depression in the bearing support is so positioned that when the tooth element engages it, the slotted opening in the inner cylinder will be in alignment with the slotted opening in the outer cylinder.

Thus, by merely depressing the picture clamp release button to engage the inner cylinder and throwing both cylinders back through a short angular distance, the clamped edge of the picture will become free and may be easily grasped and the picture removed.

If it is desired to transmit another picture, the edge of this picture may be thrust through the aligned openings and clamped between the clamping bar and the inner cylinder by releasing the picture clamp release button and permitting the outer cylinder to come back into engagement with the threaded shaft.

It will thus be realized that with the apparatus disclosed by me, the scanning drum may be loaded in a very short fraction of the time normally required with apparatus of the prior art. Should the picture to be transmitted cover but a portion of the sheet material upon which it may be printed, therefore making it desirable to stop the operation of the device when the picture portion had been transmitted, the stop element may be adjusted to a position on the shaft so that when the picture portion had been transmitted, the scanning drum will bear against the stop element and cause the operation of the shifting device whereby the apparatus will be brought to a stop position at the desired time.

Various changes in the apparatus described by me may occur to one skilled in the art. Therefore, while I have described the apparatus in detail, I do not desire to be limited in my protection to such details except as is necessitated by the prior art and the appended claims.

I claim as my invention:

1. Scanning apparatus comprising a pair of cylinders, one of said cylinders nesting within the other, a slotted opening in the outer cylinder to permit the introduction of sheet material into contact with the inner cylinder, means for affixing a contacting edge of said sheet material to said inner cylinder through said slotted opening, and means for imparting rotational movement to said inner cylinder whereby said sheet material will be caused to wrap itself about said inner cylinder in position to be scanned.

2. In scanning apparatus of the type described, a rotatable cylinder frictionally mounted on a shaft and capable of rotational movement relative thereto, said cylinder being provided with a longitudinal slotted opening in its surface, a bar of substantially the dimensions of said opening, means affixed to said shaft for supporting said bar in clamping engagement with one edge of said opening and spring means for affecting a temporary disengagement between said bar and said edge to permit of the insertion of a sheet of material.

LA VERNE R. PHILPOTT.